United States Patent
Bobye

(10) Patent No.: US 10,533,856 B2
(45) Date of Patent: Jan. 14, 2020

(54) NAVIGATION SYSTEM UTILIZING YAW RATE CONSTRAINT DURING INERTIAL DEAD RECKONING

(71) Applicant: NovAtel Inc., Calgary (CA)

(72) Inventor: Michael Bobye, Calgary (CA)

(73) Assignee: NovAtel Inc., Calgary (CA)

( * ) Notice: Subject to any disclaimer, the term of this patent is extended or adjusted under 35 U.S.C. 154(b) by 307 days.

(21) Appl. No.: 15/479,875

(22) Filed: Apr. 5, 2017

(65) Prior Publication Data
US 2018/0292212 A1    Oct. 11, 2018

(51) Int. Cl.
| G01C 21/18 | (2006.01) |
| G01C 25/00 | (2006.01) |
| G01S 19/47 | (2010.01) |
| G01C 21/16 | (2006.01) |
| G01S 5/00  | (2006.01) |

(52) U.S. Cl.
CPC .......... *G01C 21/18* (2013.01); *G01C 21/165* (2013.01); *G01C 25/005* (2013.01); *G01S 5/00* (2013.01); *G01S 19/47* (2013.01)

(58) Field of Classification Search
CPC .... G01C 21/18; G01C 21/165; G01C 25/005; G01S 5/00; G01S 19/47
USPC .......................................................... 701/500
See application file for complete search history.

(56) References Cited

U.S. PATENT DOCUMENTS

| 5,525,998 A | 6/1996 | Geier |
| 6,246,960 B1 * | 6/2001 | Lin ...................... G01C 21/165 701/472 |
| 6,285,927 B1 * | 9/2001 | Li ............................ B64G 1/24 701/13 |
| 6,285,928 B1 * | 9/2001 | Tilley ..................... B64G 1/283 701/13 |
| 6,327,523 B2 * | 12/2001 | Cellier ................... H04B 7/195 244/158.4 |
| 6,336,062 B1 * | 1/2002 | Yamashita ............. B64G 1/365 244/171 |
| 6,356,815 B1 * | 3/2002 | Wu ........................ B64G 1/361 701/13 |
| 6,381,520 B1 * | 4/2002 | Higham .................. B64G 1/24 244/172.7 |
| 6,401,036 B1 | 6/2002 | Geier et al. |
| 6,441,776 B1 * | 8/2002 | Hein ........................ B64G 1/24 244/164 |
| 6,442,385 B1 * | 8/2002 | Marko ............... H04B 7/18534 244/158.4 |

(Continued)

FOREIGN PATENT DOCUMENTS

JP    08136569 A  *  5/1996  .............. B60T 8/172

OTHER PUBLICATIONS

European Communication of Search Report (R. 61 EPC) or the partial European Search Report/Declaration of no search (R. 63 EPC) and the European Search Opinion, Application No. 18150408.5, dated Jul. 20, 2018, 9 pages.

(Continued)

*Primary Examiner* — Tuan C To
(74) *Attorney, Agent, or Firm* — Cesari and McKenna, LLP

(57) ABSTRACT

A navigation system that utilizes yaw rate constraint during inertial dead reckoning is provided. The system accumulates relative yaw measurements to produce dead reckoning mechanization update values. The system corrects for z axis drift errors.

11 Claims, 7 Drawing Sheets

(56) References Cited

U.S. PATENT DOCUMENTS

| | | | | |
|---|---|---|---|---|
| 6,481,672 B1* | 11/2002 | Goodzeit | ................. | B64G 1/26 244/169 |
| 6,702,234 B1* | 3/2004 | Goodzeit | ............... | B64G 1/283 244/164 |
| 6,721,657 B2 | 4/2004 | Ford et al. | | |
| 6,732,977 B1* | 5/2004 | Goodzeit | ................. | B64G 1/28 244/164 |
| 7,193,559 B2 | 3/2007 | Ford et al. | | |
| 7,835,826 B1* | 11/2010 | Weigl | .................... | B64G 1/288 244/164 |
| 8,019,542 B2 | 9/2011 | Hawkinson et al. | | |
| 8,311,740 B2* | 11/2012 | Chansarkar | ............ | G01S 19/26 342/357.3 |
| 2009/0254276 A1* | 10/2009 | Faulkner | ................ | G01C 21/16 701/469 |
| 2011/0087450 A1* | 4/2011 | Borenstein | ............. | G01C 21/16 702/92 |
| 2013/0179119 A1* | 7/2013 | Coddington | ............. | G01C 3/08 702/159 |
| 2013/0338915 A1* | 12/2013 | Mizuochi | ............... | G01C 21/16 701/500 |
| 2014/0121962 A1* | 5/2014 | Rao | ........................ | G01C 21/16 701/500 |
| 2014/0203971 A1 | 7/2014 | Taylor et al. | | |
| 2014/0324291 A1 | 10/2014 | Jones et al. | | |
| 2014/0372026 A1* | 12/2014 | Georgy | ................... | G01S 19/47 701/469 |
| 2014/0372027 A1* | 12/2014 | Zhang | .................. | G01C 21/206 701/500 |
| 2015/0088419 A1* | 3/2015 | Bhardwaj | ............ | G01C 21/165 701/472 |
| 2016/0366815 A1* | 12/2016 | Guyette | ................ | G01C 21/165 |
| 2017/0262712 A1* | 9/2017 | Chundrlik, Jr. | ....... | G08G 1/0962 |
| 2018/0106618 A1* | 4/2018 | Cerchio | .................. | H04W 4/33 |

OTHER PUBLICATIONS

Niu, Xiaoji, et al., "Using Land-Vehicle Steering Constraint to Improve the Heading Estimation of Mems GPS/INS Georeferencing Systems," ISPRS 2010, vol. XXXVIII, Part 1, Jan. 2010, pp. 1-5.

\* cited by examiner

NAVIGATION SYSTEM UTILIZING YAW RATE CONSTRAINT DURING INERTIAL DEAD RECKONING

BACKGROUND

Technical Field

The invention relates to GNSS/INS navigation systems and, in particular, to GNSS/INS navigation systems that utilize a yaw rate constraint during dead reckoning.

Background Information

GNSS/INS navigation systems, such as the systems described in U.S. Pat. Nos. 6,721,657 and 7,193,559, which are assigned to a common assignee and incorporated herein by reference, may be used in vehicles to aid in navigation and also in the control of the vehicles. The GNSS/INS navigation systems work well to provide accurate up-to-date INS-based position, velocity and attitude information to a vehicle navigation and control system that, in turn, provides navigation information to a user directly or via a map. Alternatively, or in addition, the vehicle navigation and control system may utilize the navigation information to control the vehicle.

A GNSS subsystem of the GNSS/INS navigation system receives GNSS satellite signals and, operating in a known manner, processes the GNSS satellite signals to produce GNSS measurements and observables and determine GNSS positions, velocities, times and associated covariance corresponding to GNSS measurement times. An INS subsystem includes an inertial measurement unit (IMU) that reads data from orthogonally positioned sensors, i.e., accelerometers and gyroscopes, and produces IMU measurements. As is known, the accelerometers and gyroscopes have associated biases that, if not corrected for, introduce drift errors into the IMU measurements. The INS subsystem, operating in a known manner, uses the GNSS position, covariance and, as appropriate, GNSS measurements and observables in an INS filter to aid in the correction of the drift errors in the INS measurements. The inertial subsystem then utilizes inertial measurements to provide INS-based position, velocity and attitude in between the GNSS measurement times, that is, during measurement intervals.

The GNSS/INS navigation system operates in a known manner to provide uninterrupted navigation information, even in environments in which sufficient numbers of GNSS satellites are not continuously in view. When updated GNSS position, velocity, and time, and associated covariance and applicable GNSS measurements and observables are not available, the GNSS/INS navigation system utilizes the inertial measurements to continue to provide updated INS-based position, velocity and attitude during the GNSS outage. The operations of the GNSS/INS navigation system without GNSS updates are referred to as dead reckoning.

The gyroscopes in the IMU, particularly in a relatively low cost IMU, tend to have very large biases and can drift quickly when left un-aided by the GNSS information. Accordingly, without the GNSS updates, the accuracy of the INS-based position, velocity and attitude is adversely affected. In particular, uncorrected gyroscope measurements result in determinations of inaccurate vehicle heading which is one of the major sources of error in the calculations of INS-based position, velocity and attitude.

The GNSS/INS navigation systems work well when the GNSS outages are relatively short, such as, for example, when the systems momentarily loose lock on the GNSS satellite signals or fewer than a required number of GNSS satellites are in view because of obstructions in the area or traveling through tunnels and so forth, and aiding is again available to control the drift errors after a single or a small number of measurement intervals. When the outage of GNSS information lasts for much longer periods of time due, for example, to the GNSS antenna falling off of the vehicle or the GNSS antenna otherwise becoming disabled, or interference such as jamming in the area, the GNSS/INS navigation system must continue to operate with inertial sensors that have unchecked drift errors over many measurement intervals. The increasingly larger drift errors adversely affect the accuracy of the operations of the system and, in particular, result in increasing inaccuracies in the determination of vehicle heading. This in turn leads to greater errors in the calculation of the INS-based position, velocity and attitude.

One way to aid in the determination of the vehicle heading during dead reckoning is to equip the vehicle with specialized instrumentation, such as, for example, a magnetometer and/or a turning angle feedback instrument, to provide additional information for use in the calculation. However, the specialized instrumentation adds to the cost and complexity of the vehicle, and thus, such instrumentation is not typically included. Accordingly, the drift errors of the INS sensors and the associated inaccuracies in the calculation of position, velocity and attitude may result in the vehicle navigation and control systems determining that the vehicle has turned, when the vehicle is actually proceeding in the same direction. Alternatively, the control system may erroneously determine that the vehicle has not turned when, in fact, the vehicle has turned. Either inaccuracy adversely affects the operations of vehicle navigation and/or vehicle control by the navigation/control system.

SUMMARY

An improved GNSS/INS navigation system or INS navigation system includes an INS filter that, during dead reckoning operations, utilizes relative yaw rate measurements, that is, the measurements of rotation about a z-axis of a vehicle, made by one or more INS sensors, to constrain the z-axis drift errors of the one or more INS sensors. The system includes a yaw rate constraint subsystem that accumulates relative yaw measurements over mechanization update intervals to produce dead reckoning mechanization update values, accumulates the values over a turn rate accumulation period that consists of one or more mechanization update intervals, and determines a corresponding yaw rate. At the start of a next mechanization update interval, the yaw rate constraint subsystem determines if the yaw rate exceeds a turn rate threshold that is based on an expected intentional turn angle in the applicable environment, i.e., land, sea or air. When the yaw rate constraint subsystem determines that the yaw rate does not exceed the threshold, and thus, that the vehicle is not turning, the subsystem directs the INS filter to perform a zero yaw rate update. The zero yaw rate update uses the rotation in the relative yaw measurements over the previous mechanization update interval to correct for the z-axis drift errors of the one or more INS sensors that contribute to the relative yaw measurement and sets the z-axis drift errors to zero for the mechanization update interval. If the yaw rate exceeds the turn rate threshold, the system does not perform a zero yaw rate update and the sensor drift error remains unchecked for the mechanization update interval.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
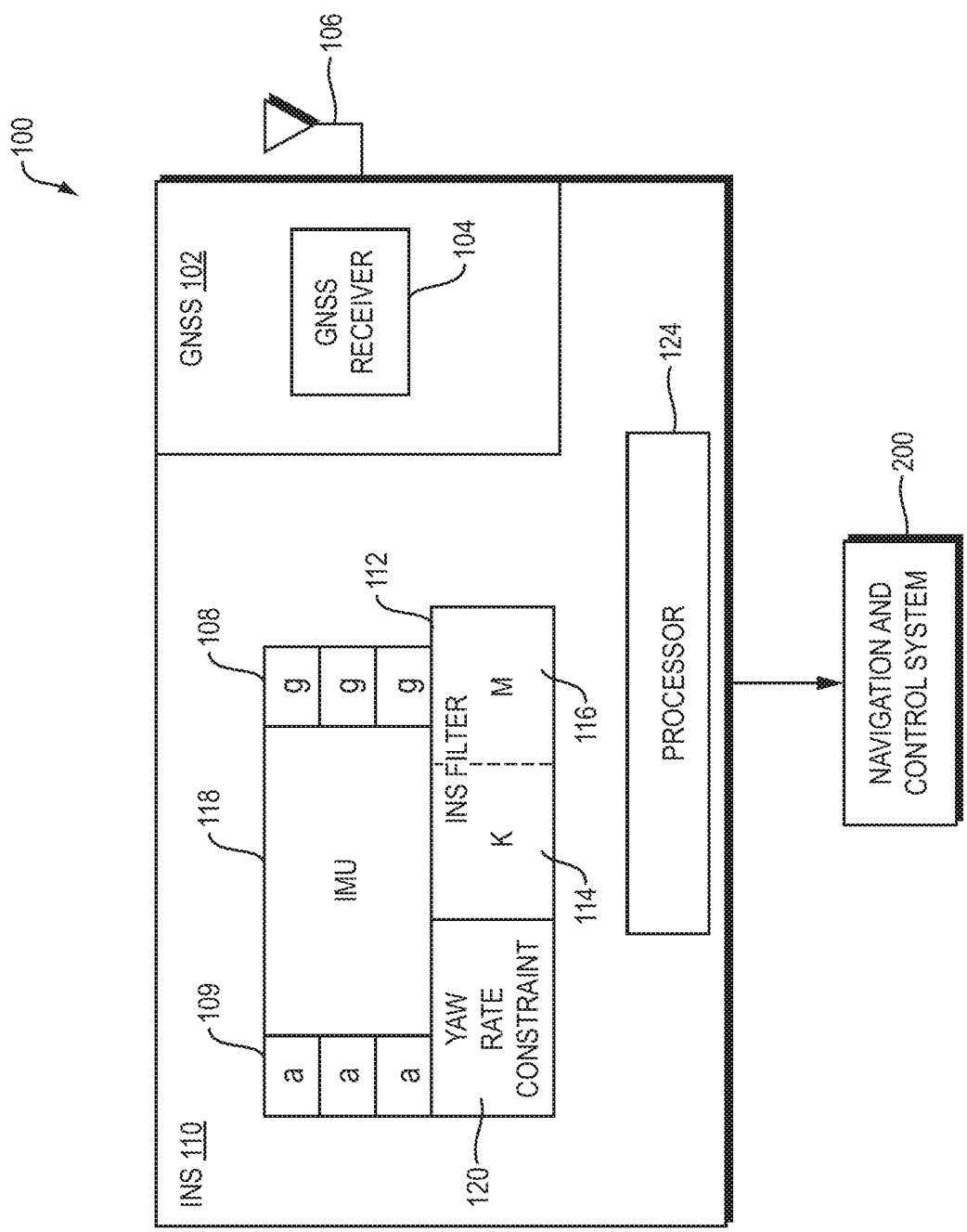
FIG. 1 is a functional block diagram of a GNSS/INS navigation system that includes a yaw rate constraint subsystem.

Referring now to FIG. 1, a GNSS/INS navigation system 100 for use with a driver controlled or driverless/autonomous vehicle (not shown) includes a GNSS subsystem 102 and an INS subsystem 110. The GNSS subsystem 102 includes a GNSS receiver 104 that operates in a known manner to process GNSS satellite signals that are received by a GNSS antenna 106 and produce GNSS raw measurements, such as pseudoranges, carrier phases, and Doppler velocities; GNSS position, velocity and time, and position covariance; and, as appropriate, GNSS observables. The GNSS raw measurements, GNSS position, velocity and time, and the position covariance and the GNSS observables are hereinafter referred to collectively as "GNSS measurement information."

The INS subsystem 110 includes an inertial measurement unit (IMU) 118 that reads data from orthogonally positioned INS sensors, which consist of accelerometers 109 and gyroscopes 108, and produces INS measurements. An INS filter 112 processes the GNSS measurement information, when available during a navigation mode, and the INS measurements and produces INS-based position, velocity and attitude. If any distance measurement indicators (DMI), such as speedometers, and so forth (not shown), are included on the vehicle, the INS subsystem includes the DMI measurements in the calculations in a known manner.

The INS subsystem 110 further includes a yaw rate constraint subsystem 120 that, as discussed below, operates with the INS filter 112 when the system 100 is operating in a dead reckoning mode.

The INS-based position, velocity and/or attitude produced by the INS subsystem 110 are provided to a navigation and control system 200, which operates in a known manner to produce navigation information that is provided to the user directly or via a map display. Alternatively, or in addition, the navigation and control system 200 operates in a known manner to utilize the navigation information to control operations of the vehicle.

The GNSS subsystem 102 and the INS subsystem 110 operate under the control of a processor 124. The processor 124 operates in a known manner to control the time tagging of the GNSS measurement information and the INS measurements. The processor further operates to control the operations of the GNSS subsystem to produce the GNSS measurement information and the INS subsystem to produce the INS measurements, as well as the operations of the INS filter to produce the INS-based position, velocity and/or attitude, which are provided to the vehicle navigation and control system 200. For ease of understanding, the operations of the GNSS subsystem and the INS subsystem are discussed without specific reference to the processor 124.

The GNSS/INS system 100 operates in two modes, a navigation mode in which GNSS measurement information is available from the GNSS subsystem 102 and the dead reckoning mode in which the GNSS measurement information is not available. In the dead reckoning mode, the yaw rate constraint subsystem 120 operates with the INS filter 112 to selectively provide aid to correct for z-axis drift errors of the one or more IMU gyroscopes that contribute to the measurement of rotation about the z-axis of the vehicle. The operations of the yaw rate constraint subsystem are discussed in more detail below.

For the discussion below, the GNSS/INS system 100 has been initialized in a known manner to operate in the navigation mode. Thus, the gyroscopes measuring rotation about the X, Y and Z axes have been identified and various associated matrices for the INS filter have been established, including matrices for a Kalman filter process 114. In the navigation mode, the INS subsystem 110 uses the GNSS measurement information in an update to the Kalman filter process 114, which provides updated error states to a mechanization process 116 in order to correct for the drift errors of the respective IMU sensors 108 and 109. The mechanization process 116 uses the updated error states and the IMU measurements to determine the INS-based position, velocity and/or attitude over the intervals between the Kalman filter process updates. The intervals between the Kalman filter updates are hereinafter referred to as "mechanization update intervals."

The INS subsystem filter 112 performs two main processes, the mechanization of the raw gyroscope and accelerometer measurements into a trajectory, that is, a time series of position, velocity and attitude, and the correction of that trajectory with updates estimated by the GNSS/INS integration process, which is the Kalman filter process 114. The Kalman filter that is used for the INS integration contains state variables representing the errors of the system being modeled, which are position, velocity, attitude, IMU sensor errors, and optionally an offset vector (or lever arm) from the IMU 118 to the GNSS antenna 106. The mechanization occurs at the rate of the IMU data (typically delta velocity and angular increments) at a relatively high rate, usually 100 Hz or higher. The Kalman filter runs at a lower rate, for example at 1 Hz, such that errors in the INS trajectory accumulate to become clearly observable when compared to the update information provided by the GNSS subsystem 102. Further, the lower rate tends to keep the updates sufficiently separated in time to eliminate, or at least mitigate, time correlated errors on the update measurements.

The Kalman filter is propagated between update measurements. Thus, the values for the states and their variances are propagated forward in time based on how they are known to behave as defined in the transition matrix. When an update measurement is available, the states can be observed and the observations are then utilized to update the gain and covariance matrices P and a state vector x.

The Kalman filter is based on a state space model that defines the relationships between the states with a first order differential equation.

$$\dot{x} = Fx + Gw$$

where F is the dynamics matrix that defines a differential equation relating the states to their time derivative, w is the noise associated with the process, and G is a matrix that acts as a shaping filter to distribute the noise across the states.

The solution to this set of differential equations in the discrete domain is:

$$x_k = \Phi_{k,k-1} x_{k-1} + w_k$$

where $\Phi_{k,k-1} = e^{F\Delta t}$, which is typically approximated in a first order linearization as $\Phi_{k,k-1} \cong I + F\Delta t$, $W_k$ is the noise associated with the state space model, and $\Phi$ is the transition matrix that defines the interactions between the states in discrete Kalman filter processes. Because of the relationships between states, directly observing one state allows the filter to estimate other states that are not directly observed but have a linkage to the directly observed error state.

The Kalman filter is propagated between update measurements. Thus, the values for the states and their variances are propagated forward in time based on how they are known to behave as defined in the transition matrix. When an update measurement is available, the states can be observed and the observations are then utilized to update gain and covariance matrices P and the state vector x. The update measurement is an external measure of the state values, while the Kalman filter propagation provides the assumed state values based on the model. The update measurement does not need to directly observe states. It can indirectly observe states if a model can be made to combine the states into the domain of the measurement:

$$z_k = H_k x_k,$$

where z is a function of the states and H is the design matrix. The variable $\hat{z}_k$ used in the update is the absolute measurement made, while $z_k$ is the value computed by the observation model and the current state estimates $x_k$.

The Kalman filter process is defined by propagation equations:

$$P_k^- = \Phi_{k,k-1} P^- \Phi_{k,k-1}^T + Q_k$$

$$x_k^- = \Phi_{k,k-1} x_{k-1}^+$$

where Q is a matrix that represents the time propagation of the spectral densities of the state elements, and update equations:

$$K_k = P_k^- H_k^T [H_k P_k^- H_k^T + R_k]^{-1}$$

$$\hat{x}_k^+ = \hat{x}_k^- + K_k(\hat{z}_k - H_k \hat{x}_k^-)$$

$$P_k^+ = [I - K_k H_k] P_k^-$$

where $R_k$ is the measurement variance matrix for the absolute measurements and K is the gain matrix.

The propagation step can happen as often as the user would like updated state and variance estimates based on the state space model. The update step can happen whenever an external aiding measurement is available. In an INS integration filter it is typical to run the propagation step to precede the update step, because the mechanization process is providing the full system values (i.e. position, velocity, and attitude) at a high rate (i.e. >100 Hz) allowing the errors described in the Kalman filter's state vector to accumulate. The errors are thus well observed in the update measurement, which happens at a lower rate (i.e. 1 Hz). After every update, the estimated state vector is used to correct the mechanized trajectory (and update IMU sensor error estimates), and then set to zero, because once the error estimates have been applied to the trajectory, all known error has been removed from the system.

In the update process, the gain matrix K is formed as a combination of the design matrix H, the state variance matrix P, and the update measurement variance matrix R. The design matrix defines how the states are combined to create the observation equation, and this determines the observability of the states through the update. The state and measurement variance matrices control how much a state can be corrected by the update, that is, they control the overall gains for each state. For example, if the measurement has a much larger variance than the state variance, even if the design matrix indicates that the measurement has strong observability, the correction to the states will be minimized, via a small gain value, because the filter knowledge of the state is stronger than the measurement. As different update measurements are applied in the filter, with different design matrices and varying measurement qualities, the extended Kalman filter state estimates begin to converge. This convergence is indicated in the state variance matrix P, as the matrix is updated with the gain matrix and design matrix of the update measurements.

When signals from a sufficient number of GNSS satellite signals are available, the GNSS subsystem 102 operates in a known manner to provide GNSS measurement information to the INS subsystem at the start of a mechanization update interval. In the example, the mechanization update intervals are timed to the updating of the GNSS measurement information, which occurs at 1 second intervals. The INS subsystem 110, operating in a known manner, utilizes the GNSS measurement information to correct for the drift of the INS sensors by updating the error states. The INS subsystem also utilizes the IMU measurements and produces the INS-based position, velocity and attitude that are provided to the vehicle navigation and control system 200 over the mechanization update interval.

The vehicle navigation and control system then operates in a known manner to utilize the INS-based position, velocity and attitude information to produce updated navigation information which may be provided to a user either directly or via a map display. The navigation information may also be used to control the vehicle, such as, for example, to providing steering corrections or steering the vehicle entirely during autonomous driving sessions.

The GNSS/INS system 100 continues to operate in the navigation mode as long as updated GNSS measurement information is available. When updated GNSS measurement information is not available, the GNSS/INS system 100 operates in the dead reckoning mode in which the INS measurements are utilized without the aiding of the GNSS measurement information that corrects for the IMU sensor biases, or drift errors, in the IMU measurements.

The yaw rate constraint subsystem 120 operates in both the navigation mode and the dead reckoning mode to accumulate the relative yaw measurements, that is, the measurements of one or more IMU gyroscopes 108 along the z-axis of the vehicle, over the mechanization update intervals. For ease of explanation, the z-axis gyroscope measurements accumulated over a mechanization update are hereinafter referred to as a "dead reckoning mechanization update value." The yaw rate constraint subsystem further accumulates the dead reckoning mechanization update values over turn rate accumulation periods, which as discussed below may be one or more mechanization update intervals long. For each turn rate accumulation period, the yaw rate constraint subsystem determines a corresponding yaw rate, which is utilized when the system 100 is operating in the dead reckoning mode, as discussed in more detail below.

While in the dead reckoning mode, the INS-based position, velocity and attitude updated to the end of a mechanization update interval are used at the start of a next mechanization update interval. The yaw rate constraint subsystem 120 operates with the INS filter 112, to selectively aid the correction of drift errors of the one or more IMU gyroscopes that make the measurements associated with relative yaw, that is, the measurements of rotation about the z-axis of the vehicle.

The yaw rate constraint subsystem 120 accumulates dead reckoning mechanization update values over a turn rate accumulation period to determine a corresponding yaw rate. Based on the yaw rate, the yaw rate constraint subsystem determines if the vehicle is turning, and thus, whether or not the INS subsystem 110 should perform a zero yaw rate update to correct for the z-axis drift errors of the IMU gyroscopes that contributed to the relative yaw measurements, as discussed in more detail below.

The turn rate accumulation period is selected to be relatively short, and is selected as a trade-off between providing aiding to correct for the drift errors often and confidence in the determination of whether or not the vehicle is turning. The INS sensor readings are taken at the IMU rate and the turn rate accumulation period is selected to be one or more mechanization update intervals long. If the IMU gyroscopes are low cost gyroscopes that tend to have noisy measurements, the turn rate accumulation period may be selected to be multiple mechanization update intervals long, to ensure confidence in the determination of whether or not the vehicle is turning. The turn rate accumulation period may also, or in addition, be selected to be longer based on the vehicle and/or the environment in which the vehicle travels. For example, a longer turn rate accumulation period may be selected for a system 100 operating in a tractor as opposed to operating in a luxury car. In the example, the vehicle is a luxury car and the IMU uses low cost gyroscopes, and the turn rate accumulation period is selected to be 5 mechanization update intervals long. For a system in which the mechanization update interval is 1 second long, as in the example, the turn rate accumulation period is 5 seconds long.

After accumulating the dead reckoning mechanization update value over the turn rate accumulation period, the yaw rate constraint subsystem 120 determines if the yaw rate over the turn rate accumulation period is below a turn threshold that is set at or slightly above an intentional turn rate determined for the environment in which the vehicle is traveling. In the example, the vehicle is traveling on land and the intentional turn rate turn is determined to be greater than 0.5 degrees/second, and the turn threshold is set at 0.75 degrees/second. If the calculated yaw rate does not exceed the turn threshold, the yaw rate constraint subsystem directs the INS filter to perform a zero yaw rate update, to correct for drift errors in the z-axis measurements of the IMU gyroscopes. If the calculated yaw rate exceeds the turn rate the INS filter is not instructed to perform the zero rate update.

When the yaw rate constraint subsystem 120 determines that the yaw rate does not exceed the turn threshold, and thus, that the vehicle is not turning, the yaw rate constraint subsystem directs the INS filter 112 to perform the zero yaw rate update. The INS filter 112 thus uses the dead reckoning mechanization update value for the previous mechanization update interval to correct for the z-axis drift errors of the IMU z-axis gyroscopes, and then sets the z-axis drift errors to zero to start the mechanization interval.

To perform the zero yaw rate update, the INS filter 112 utilizes the design matrix H with the attitude states filled, and an observation equation z and an update variance R provided below:

$$H_{1 \times N}=[000 \ldots R_{I_{13}}{}^e R_{I_{23}} R_{I_{33}}{}^e \ldots 000]$$

$$z_{1 \times 1}=0.0-\Sigma Gyro_z{}^I$$

$$R_{1 \times 1}=(3.0 * \text{Standard Deviation}(\Sigma Gyro_z{}^I))^2$$

in the standard Kalman update routines discussed above. The rotation matrix included in the design matrix H is defined by the mechanization frame of the INS filter. In the example, the mechanization frame of the INS filter is the ECEF frame.

Notably, the operations of the yaw rate constraint subsystem 120 are not adversely affected by the speed of the vehicle. Rather, the yaw rate constraint subsystem operates efficiently to determine if a zero yaw rate update should be performed to correct for the IMU gyroscope z-axis drift errors, whether the vehicle is stopped, moving slowly or speeding along. Further, if the level of noise in the relative yaw measurements is high, the INS filter may appropriately weight the measurements that are utilized to perform the zero yaw rate update, to minimize correcting for the excess noise in the measurements.

At the start of each mechanization update interval during dead reckoning operations, the yaw rate constraint subsystem 120 determines if the yaw rate that is associated with the current turn rate accumulation period, that is, the accumulation period that ends at the end of the previous mechanization update interval, falls below the turn rate threshold. If so, the yaw rate constraint subsystem directs the INS filter to perform a zero yaw rate update using the dead reckoning mechanization update value from the previous mechanization update interval.

The INS filter performs the zero yaw rate update, which updates the error state of the IMU gyroscopes that contribute to the relative yaw measurements to correct for the z-axis drift error. The INS filter then sets the z-axis drift errors of the IMU gyroscopes to zero for the start of the mechanization update interval.

If the yaw rate constraint subsystem instead determines that the calculated yaw rate exceeds the turn rate threshold, indicating that the vehicle is turning, the subsystem does not direct the INS filter 110 to perform a zero yaw rate update. Thus, the z-axis drift errors remain unchecked for the start of the mechanization update interval. Since the yaw rate constraint subsystem determines, at the start of each mechanization update interval, if a zero yaw rate update should be performed, the z-axis drift errors are again corrected for once the vehicle completes its turn. Thus, the z-axis drift errors remain unchecked for one or a small number of mechanization update intervals.

Figure 2A:
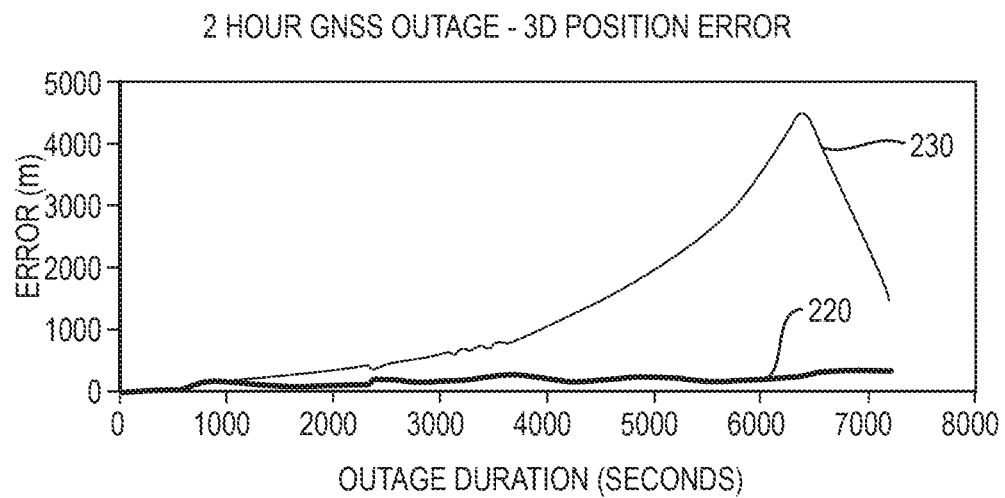
FIGS. 2A-C are charts of position, velocity and azimuth errors by a GNSS/INS navigation system with the yaw rate constraint subsystem of FIG. 1 and a GNSS/INS navigation system without the yaw rate constraint subsystem of FIG. 1.
Figure 2B:
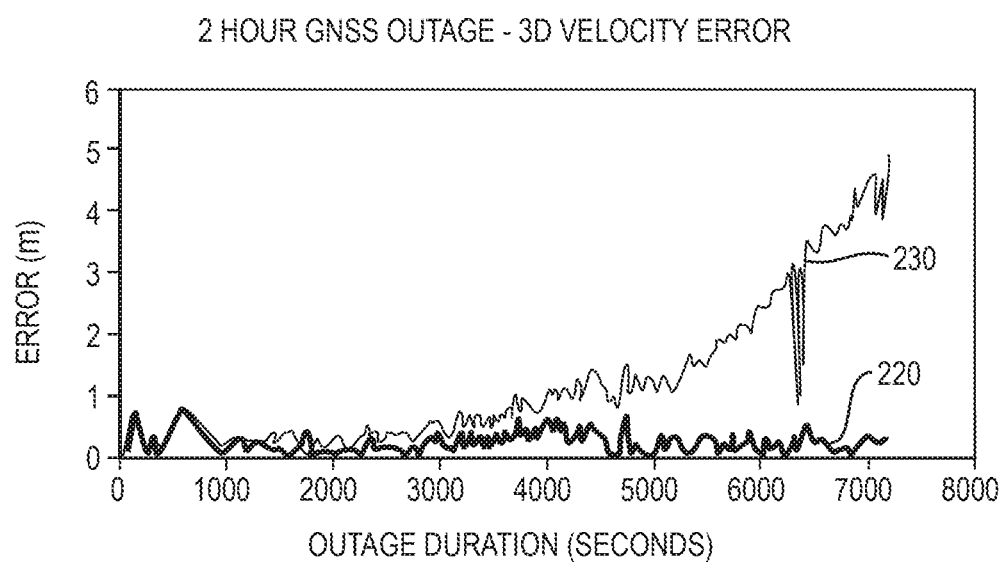
Figure 2C:
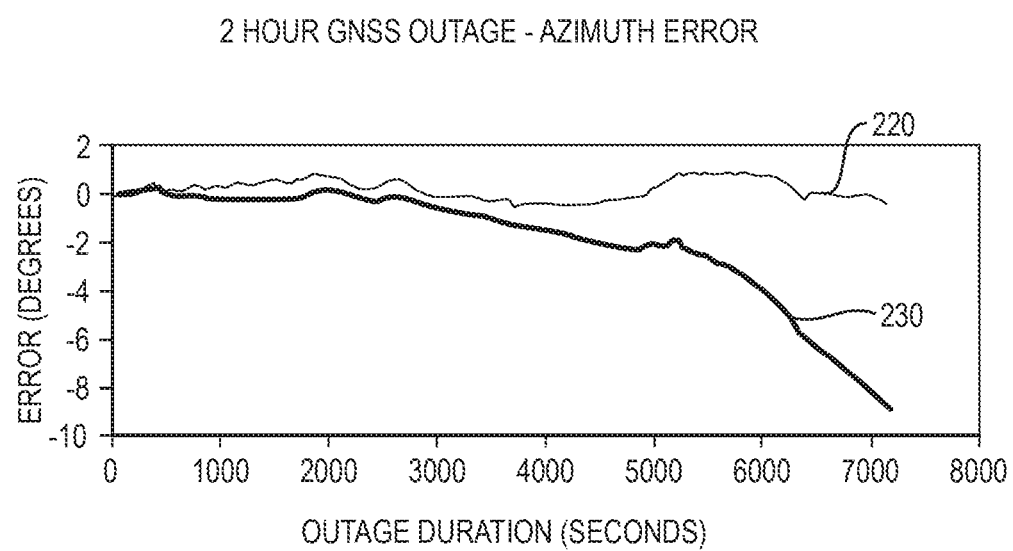

Referring now to Figs. 2A-C, the error rates are plotted against time for the calculations of INS-based position (FIG. 2A), velocity (FIG. 2B) and attitude, or azimuth (FIG. 2C), during a 2 hour GNSS outage, i.e., during a 2 hour period of operating in the dead reckoning mode. The error rates for a navigation system that operates with the yaw rate constraint subsystem 120 are represented in the respective charts by line 220 and the error rates for the navigation system that operates without the yaw rate constraint subsystem are represented in the respective charts by line 230. As shown in the charts, the error rates associated with the navigation system that utilizes the yaw rate constraint subsystem are near zero degrees over the 2 hour outage, while the error rates associated with the navigation system that does not utilize the yaw rate constraint subsystem grow over much if not all of the 2 hour GNSS outage.

Figure 3:
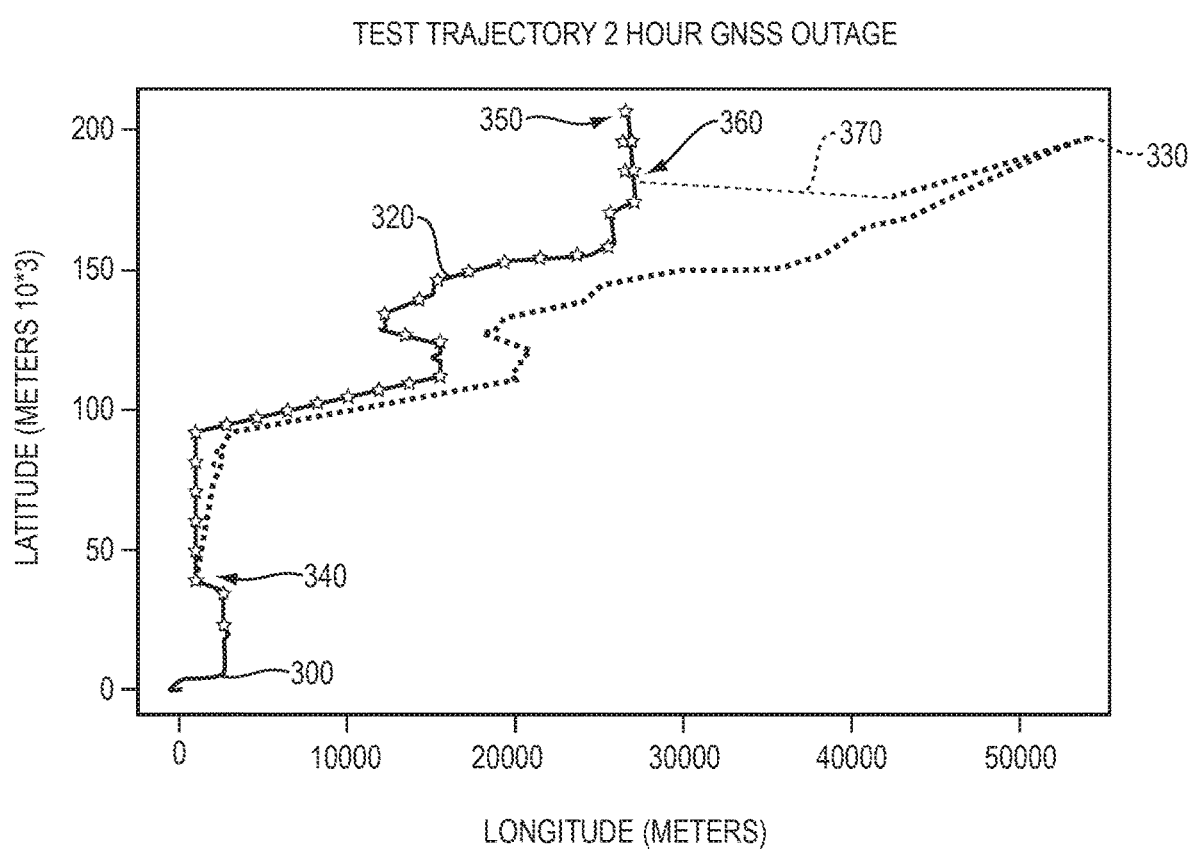
FIG. 3 is a plot of respective routes determined during dead reckoning by a system with the yaw rate constraint subsystem of FIG. 1 and a system without the yaw rate constraint subsystem of FIG. 1.

Referring now to FIG. 3, a solid line 300 illustrates the route traveled by a vehicle over a highway for approximately 4 hours, which includes a 2 hour GNSS outage that begins at a time that coincides with point 340, continues while the vehicle turns around at a time that coincides with point 350, and ends as the vehicle returns along the same highway at a time that coincides with point 360, that is, GNSS again becomes available at this time. The route depicted by line 300 is plotted as distance traveled in meters from the start location.against axes of latitude in meters and longitude in meters. The starred line 320 represents a route determined by a GNSS/INS navigation system with DMI and the yaw rate constraint subsystem 120, which operates as discussed above when the system is in the dead reckoning mode during the 2 hour GNSS outage. The dotted line 330 represents the route determined by a GNSS/INS navigation system with DMI and without the yaw rate constraint subsystem. The route 320 determined by the system with DMI and the yaw rate constraint subsystem closely follows the actual route 300 throughout the entire journey, including during the two hour GNSS outage. The route 330 determined without the aiding of the yaw rate subsystem exhibits increasing position inaccuracies during the 2 hour GNSS outage. When the GNSS measurement information is again available, at the time that coincides with point 360, the system without the yaw constraint subsystem undergoes a relatively rapid correction, represented by the section 370 of the line 330, to bring the route determined by the system coincident with the highway.

Figure 4:
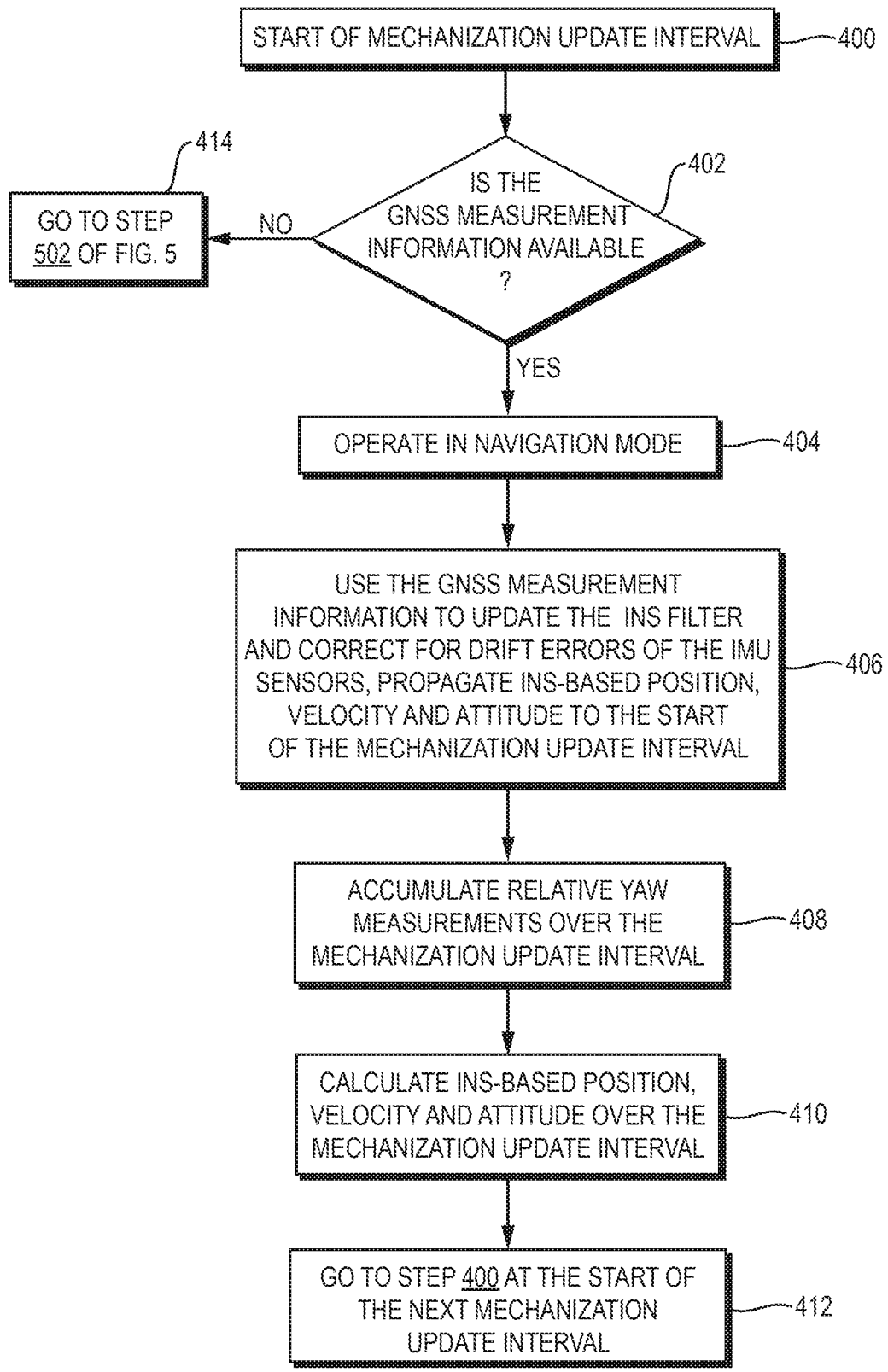
FIGS. 4 and 5 are flow charts of the operation of the system of FIG. 1.
Figure 5:
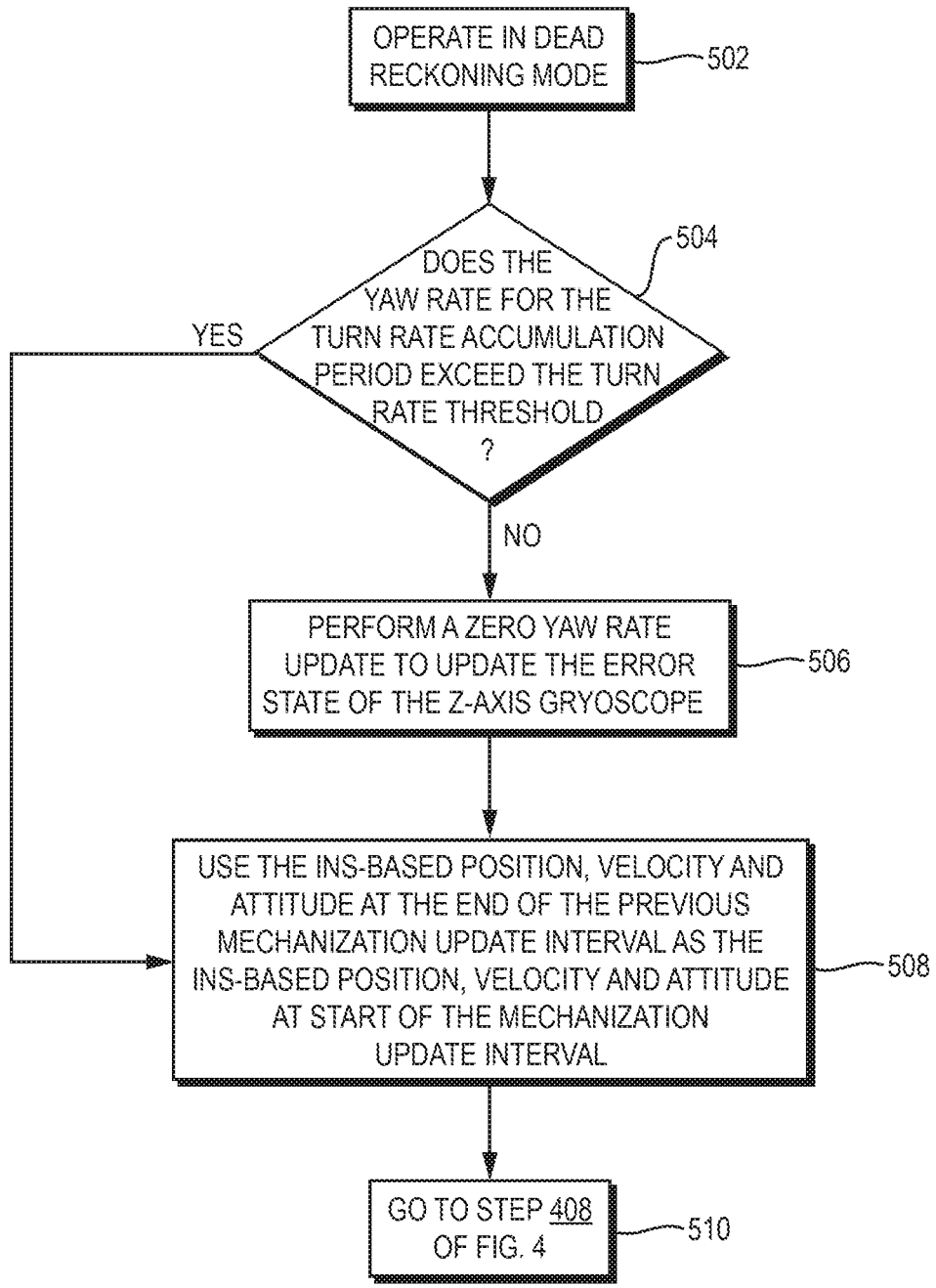

FIGS. 4 and 5 are flow charts of the operations of the system to FIG. 1. At the start of a mechanization update interval, the GNSS/INS system 100 operates in the navigation mode if GNSS measurement information is available. Steps 400, 402, 404. The GNSS/INS system utilizes the GNSS measurement information to update the INS filter 112 and correct for the drift errors of the IMU sensors 108 and 109 and determine the INS-based position, velocity and attitude for the start of the mechanization update interval. Step 406. The system then uses the IMU measurements to calculate INS-based position, velocity and attitude, over the mechanization update interval. Step 408. Further, the system accumulates the relative yaw measurements into dead reckoning mechanization update values and accumulates the dead reckoning mechanization update values over the turn rate accumulation period that coincides with the end of the mechanization update interval, and determines a corresponding yaw rate. Step 410. In Step 412, the system then goes to Step 400 at the start of the next mechanization update interval.

If the GNSS measurement information is not available at the start of a mechanization update interval, the GNSS/INS system operates in the dead reckoning mode. Steps 400, 402, 414 and 502. In the dead reckoning mode, the yaw rate constraint subsystem 120 determines if the yaw rate for the current turn rate accumulation period, which ends at the end of the previous mechanization update interval, exceeds the turn rate threshold. Step 504. If not, the INS filter performs a zero yaw rate update using the dead reckoning mechanization update value for the previous mechanization update interval, that is, the accumulation of the relative yaw measurements over the previous mechanization update interval, to update the error states and correct for the z-axis drift errors of the IMU gyroscopes contributing to the relative yaw measurements. The system also sets the z-axis drift errors of the contributing IMU gyroscopes to zero. Step 506. The system then uses the INS-based position, velocity and attitude at the end of the previous mechanization update interval for the start of the current mechanization update interval. Step 508.

In Step 510, the system goes to Step 408 of FIG. 4. The system thus calculates the INS-based position, velocity and attitude over the mechanization update interval based on the IMU measurements. In Step 410, the system updates the calculated yaw rate for the current turn rate accumulation period based on the dead reckoning mechanization update value calculated for the current mechanization update interval. In Step 412, the system returns to Step 400 at the start of a next mechanization update interval and determines if the system continues to operate in the dead reckoning mode or instead operates in the navigation mode, and so forth.

If, at Step 504, the yaw rate exceeds the turn rate threshold, the system does not perform a zero yaw update. Step 512. The system in, Step 508, uses the INS-based position, velocity and attitude at the end of the previous mechanization update interval for the start of the current mechanization update interval. In Step 510, the system goes to Step 408 of FIG. 4. The system thus calculates the INS-based position, velocity and attitude, over the measurement interval, based on IMU measurements. In Step 410, the system also accumulates relative yaw measurements over the mechanization update interval to produce the dead reckoning mechanization update value and the system updates the yaw rate for the current turn rate accumulation period, and in Step 412 the system goes to Step 400 and repeats the various steps at the start of the next mechanization update interval.

Figure 6:
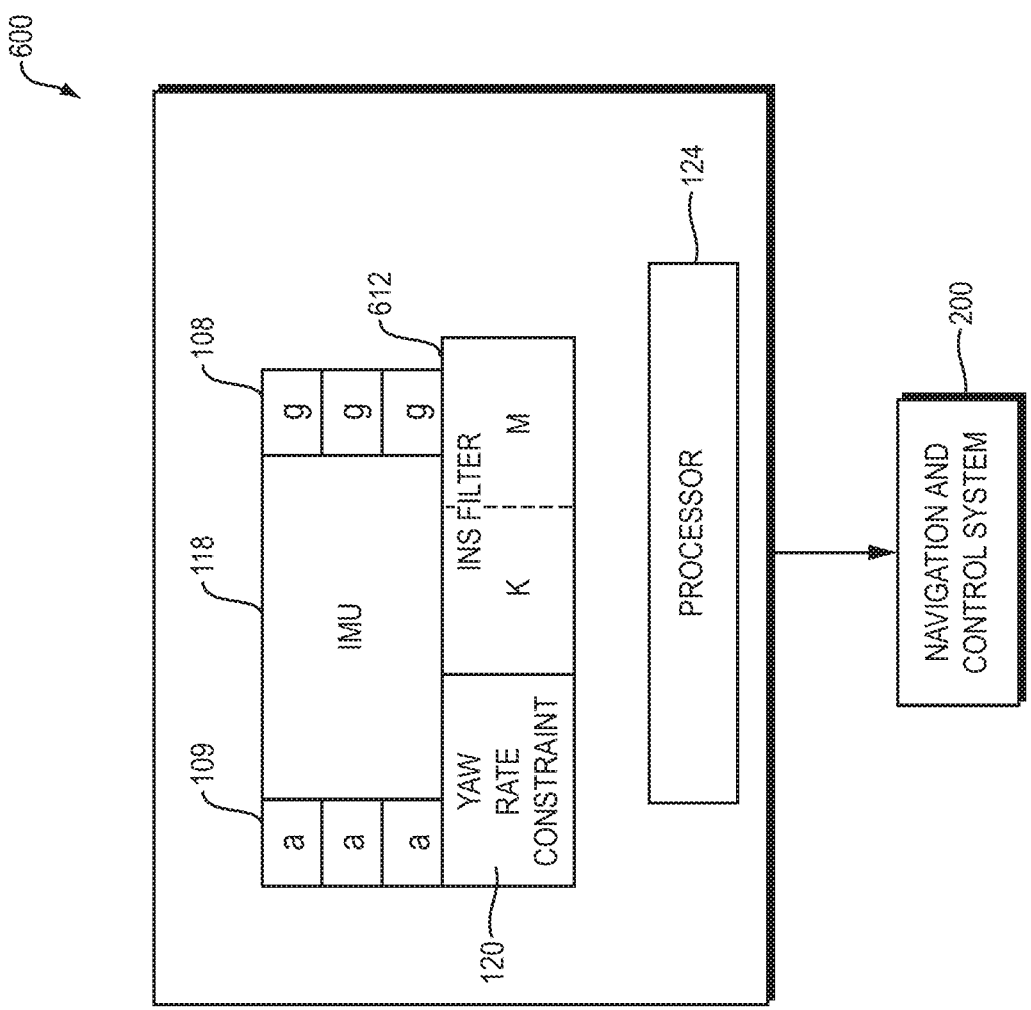
FIG. 6 is a functional block diagram of an inertial system that includes the yaw rate constraint system of FIG. 1.

Referring now to FIG. 6, an improved inertial navigation system 600 that operates as a dead reckoning device includes an IMU 110 with orthogonally positioned accelerometers and gyroscopes 108 and 109, and an INS filter 612, which operates using IMU measurements in the same manner as the INS filter 112 of FIG. 1. The system further includes the yaw rate constraint system 120 that operates as described above, such that the z-axis drift errors of the IMU gyroscopes that contribute to the relative yaw measurements, which are measurements of rotation about a z-axis of the vehicle (not shown), are constrained using relative yaw measurements taken when the vehicle is not turning. The inertial navigation system 600 may also utilize information provided by DMI sensors (not shown), in the manner discussed above.

The system 600 performs Steps 504, 506, 508, 510, 512 of FIG. 5 and steps 408 and 410 of FIG. 4 before returning to Step 504 at the start of the next mechanization update interval.

The GNSS/INS navigation system 100 and inertial navigation system 600 each utilize the yaw rate constraint subsystem 120 during dead reckoning operations to provide aiding to correct for the z-axis drift errors of the one or more IMU gyroscopes that contribute to the relative yaw measurements, as long as the system determines that the vehicle is not then turning. Accordingly, during the dead reckoning operations, the system determines vehicle heading and, in turn, INS-based position, velocity and attitude, with increased accuracy over systems that do not utilize the yaw rate constrain subsystem.

While the GNSS/INS system 100 is depicted as consisting of various interconnected subsystems, the system may be configured with more or fewer subsystems, and the system processor 124 may consist of two or more processors that operate respectively with one or more of the subsystems. Further, the yaw rate constraint subsystem may operate to begin accumulating the relative yaw measurements at the start of the dead reckoning mode, such that there is a delay equal to the length of the turn rate accumulation period before the yaw rate constraint subsystem determines if zero yaw updates should be performed. Additionally, the yaw rate constraint system may, but need not, calculate the yaw rate while the system is operating in the navigation mode.

What is claimed is:

1. A Global Navigation Satellite System (GNSS)/inertial (INS) navigation system including:
   a GNSS subsystem including a GNSS antenna that receives GNSS satellite signals and a GNSS receiver that processes the GNSS satellite signals to produce GNSS measurement information;
   an INS subsystem including
      an inertial measurement unit (IMU) with a plurality of sensors including one or more gyroscopes that measure rotation about a z axis, the IMU being configured to produce IMU measurements for the respective sensors,
      a yaw rate constraint subsystem configured to accumulate the IMU measurements of rotation about the z-axis over mechanization update intervals to produce dead reckoning mechanization update values and accumulate the values over a turn rate accumulation period and calculate a corresponding yaw rate, the yaw rate constraint subsystem being further configured to operate during a dead reckoning mode to determine at the start of a next mechanization update interval, if the calculated yaw rate exceeds a turn rate threshold, and if not, direct an INS filter to perform a zero yaw rate update,
      the INS filter being configured to
      process the GNSS measurement information and the IMU measurements at the start of the mechanization update interval when the GNSS/INS system is in a navigation mode,
      process the IMU measurements and perform the zero yaw rate update if directed to do so at the start of the mechanization update interval when the GNSS/INS system is in the dead reckoning mode, and
      process the IMU measurements over the mechanization update interval to produce one or more of INS-based position, velocity and attitude.

2. The GNSS/INTS navigation system of claim 1 wherein the turn rate threshold is associated with an intentional turn rate that corresponds to an environment in which the GNSS/INS system is operating.

3. The GNSS/INS navigation system of claim 2 wherein the turn rate accumulation period includes one or more mechanization update intervals.

4. The GNSS/INTS navigation system of claim 3 wherein the zero yaw rate update is performed using accumulated z-axis measurements from the previous mechanization update interval.

5. The GNSS/INTS navigation system of claim 4 wherein the yaw rate constraint subsystem further assigns weights to the z-axis measurements based on a level of noise observed over the previous mechanization update interval before performing the zero yaw rate update.

6. The GNSS/INTS navigation system of claim 1 wherein the INS filter is a Kalman filter and the zero yaw rate update utilizes a design matrix H with the attitude states filled, and an observation equation z and an update variance R $$H_{1 \times N} = [0\ 0\ 0\ \ldots\ R_{I_{13}}{}^e R_{I_{23}}{}^e R_{I_{33}}{}^e\ \ldots\ 0\ 0\ 0]$$

$$z_{1 \times 1} = 0.0 - \Sigma Gyro_z{}^I$$

$$R_{1 \times 1} = (3.0 * \text{Standard Devation}(\Sigma Gyro_z{}^I))^2$$

where the rotation matrix included in the design matrix H is defined by the mechanization frame of the INS filter.

7. An inertial (INS) navigation system including
   an inertial measurement unit (IMU) with a plurality of sensors including one or more gyroscopes that measure rotation about a z axis, the IMU being configured to produce IMU measurements for the respective sensors,
   a yaw rate constraint subsystem configured to accumulate the z-axis measurements over mechanization update intervals to produce dead reckoning mechanization update values, accumulate the values over a turn rate accumulation period and produce a yaw rate, the yaw rate constraint subsystem being further configured to determine at the start of a mechanization update interval, if the yaw rate exceeds a turn rate threshold, and if not, direct an INS filter to perform a zero yaw rate update, and
   the INS filter being configured to
   process the IMU measurements and perform the zero yaw rate update if directed to do so at the start of a next mechanization update interval, and
   process the IMU measurements over the next mechanization update interval to produce one or more of INS-based position, velocity and attitude.

8. The INS navigation system of claim 7 wherein the turn rate threshold is associated with an intentional turn rate that corresponds to an environment in which the INS navigation system is operating.

9. The INS navigation system of claim 8 wherein the turn rate accumulation period includes one or more mechanization update intervals and the zero yaw rate update is performed using the dead reckoning mechanization update value from the previous mechanization update interval.

10. The INS navigation system of claim 7 wherein the yaw rate constraint subsystem further assigns weights to the z-axis measurements based on a level of noise in the measurements over the previous mechanization update interval before performing the zero yaw rate update.

11. The INS navigation system of claim 7 wherein the INS filter is a Kalman filter and the zero yaw rate update utilizes a design matrix H with the attitude states filled, and an observation equation z and an update variance R $$H_{1 \times N} = [0\ 0\ 0\ \ldots\ R_{I_{13}}{}^e R_{I_{23}}{}^e R_{I_{33}}{}^e\ \ldots\ 0\ 0\ 0]$$

$$z_{1 \times 1} = 0.0 - \Sigma Gyro_z{}^I$$

$$R_{1 \times 1} = (3.0 * \text{Standard Devation}(\Sigma Gyro_z{}^I))^2$$

where the rotation matrix included in the design matrix H is defined by the mechanization frame of the INS filter.

* * * * *